US008775564B1

(12) United States Patent
Smart et al.

(10) Patent No.: US 8,775,564 B1
(45) Date of Patent: Jul. 8, 2014

(54) TIME BASED CDN TRAFFIC ALLOCATION

(71) Applicant: Limelight Networks, Inc., Tempe, AZ (US)

(72) Inventors: Kenneth Smart, Maricopa, AZ (US); Peter Coppola, San Diego, CA (US); Jacob S. Roersma, Ada, MI (US); Lonhyn Jasinskyj, Tempe, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 14/145,617

(22) Filed: Dec. 31, 2013

(51) Int. Cl.
*G06F 15/16* (2006.01)
(52) U.S. Cl.
USPC ............ 709/218; 709/219; 709/203; 709/224
(58) Field of Classification Search
USPC .......................... 709/202–203, 217–219, 224
See application file for complete search history.

(56) References Cited

U.S. PATENT DOCUMENTS

| | | | |
|---|---|---|---|
| 6,961,783 B1 | 11/2005 | Cook et al. | |
| 7,155,723 B2 * | 12/2006 | Swildens et al. | 718/105 |
| 7,734,730 B2 | 6/2010 | McCanne | |
| 2005/0021863 A1 | 1/2005 | Jungck | |
| 2006/0075139 A1 | 4/2006 | Jungck | |
| 2011/0082916 A1 | 4/2011 | Swanson et al. | |
| 2012/0321052 A1 | 12/2012 | Morrill et al. | |
| 2013/0227284 A1 | 8/2013 | Pfeffer et al. | |

OTHER PUBLICATIONS

Su, Ao-Jan. et al., "Drafting Behind Akamai: Inferring Network Conditions Based on CDN Redirections", Retrieved on Jan. 15, 2014 from networks.cs.northwestern.edu/publications/ton-Akamai.pdf, Dec. 2009, 14 pages, vol. 17, Issue: 6, IEEE/ACM Transactions on Networking.

* cited by examiner

*Primary Examiner* — David Lazaro
(74) *Attorney, Agent, or Firm* — Kilpatrick Townsend & Stockton LLP

(57) ABSTRACT

A content delivery network (CDN) performs time varying traffic allocation. The network includes: one or more edge servers that store content corresponding to a domain name that is associated with a content provider, and are configured to deliver the content to end users in response to requests received at the edge servers from the end users; analytics information characterizing the CDN; and a traffic engine that periodically evaluates a service function as having a serve value or a shunt value for the domain name, based at least in part on the analytics information. The traffic engine transmits one or more IP addresses of the edge servers to an interface to a domain name service (DNS) while the service function has the serve value for the domain name; and transmits alternate domain name information of a different network to the interface while the service function has the shunt value.

18 Claims, 8 Drawing Sheets

TIME BASED CDN TRAFFIC ALLOCATION

BACKGROUND

Large amounts of content are delivered regularly over the Internet. The content serves a wide variety of purposes, such as one-time display (e.g., streaming audio and video for entertainment and news purposes), commerce (e.g., text, video and graphics for advertising and sales purposes), downloadable media such as books and documents, and many others. Content Delivery Networks (CDNs) are often seen as providing "capacity of last resort" for companies that provide content, or services that involve content, over the Internet.

SUMMARY

In an embodiment, content delivery network (CDN) performs time varying traffic allocation. The network includes: one or more edge servers that store content corresponding to a domain name that is associated with a content provider, and are configured to deliver the content to end users in response to requests received at the edge servers from the end users; analytics information characterizing the CDN; and a traffic engine that periodically evaluates a service function as having a serve value or a shunt value for the domain name, based at least in part on the analytics information. The traffic engine transmits one or more IP addresses of the edge servers to an interface to a domain name service (DNS) while the service function has the serve value for the domain name; and transmits alternate domain name information of a different network to the interface while the service function has the shunt value. At a first time, the traffic engine determines, based on the analytics information, that the service function has the serve value for the domain name, the traffic engine transmits an IP address of at least one of the edge servers to the interface, and the one of the edge servers serves content corresponding to the domain name, in response to a request for the content from one of the end users that is directed to the domain name and is resolved by the DNS to provide the IP address. At a second time, the traffic engine determines, based on the analytics information, that the service function has the shunt value for the domain name, and the traffic engine transmits the alternate domain name information of the different network to the interface.

In another embodiment, a content delivery network (CDN) performs time varying traffic allocation. The network includes: one or more edge servers that store content from one or more content providers, and deliver the content to end users in response to requests from the end users; a traffic engine that transmits an authoritative internet protocol (IP) address of one of the edge servers that stores at least one content object of the content, and alternate domain name information of a different network, to a domain name service (DNS), adjusts parameters of a service percentage algorithm that defines a percentage of incoming requests for the content object that will be served by the CDN, with other incoming requests being shunted to the different network, based on analytics information characterizing the CDN, and periodically transmits the service percentage algorithm to the DNS; and the DNS, which: receives the authoritative IP address, the alternate domain name information and the parameters from the traffic engine, receives requests for domain name resolution, and in response to a received domain name resolution request: evaluates the service percentage algorithm to determine whether the received domain name resolution request will be served or shunted, and responds to the received domain name resolution request with the authoritative IP address when the received domain name resolution request will be served, or with the alternate domain name information when the received domain name resolution request will be shunted. At a first time, the DNS responds to a first percentage of domain name resolution requests for a domain name associated with the content object by delivering the authoritative IP address, the one of the edge servers having the authoritative IP address serves the content object, and the DNS responds to other domain name resolution requests for the domain name associated with the content object by responding with the alternate domain name information such that the other domain name resolution requests are shunted to the different network. At a second time, the DNS responds to a second percentage of domain name resolution requests for the domain name associated with the content object by delivering the authoritative IP address for one of the edge servers, the second percentage being different from the first percentage based on the analytics information, the one of the edge servers having the authoritative IP address serves the content object, and the DNS responds to other domain name resolution requests for the domain name associated with the content object by responding with the alternate domain name information such that the other domain name resolution requests are shunted to the different network.

In another embodiment, a method of time-based content delivery network (CDN) traffic allocation includes: storing content, from one or more content providers and associated with one or more domain names, on a plurality of edge servers that are configured to deliver the content to end users in response to requests received by the edge servers from the end users, each of the domain names being hosted by at least one of the edge servers; storing an authoritative internet protocol (IP) address for the one or more domain names; storing alternate domain name information for the one or more domain names; and determining a service function as having a serve value or a shunt value for each of the domain names, based at least in part on analytics information of the CDN. When a domain name service (DNS) request is received by the CDN from one of the end users for one of the domain names, and when the service function for the one of the domain names has the serve value, the method includes transmitting the authoritative IP address for at least one of the edge servers that hosts the one of the domain names, in response to the DNS request, receiving a request for the one of the domain names at the edge server having the authoritative IP address, and delivering content of the requested one of the domain names, from the edge server having the authoritative IP address to the one of the end users. When the service function for the one of the domain names has the shunt value, the method includes transmitting the alternate domain name information in response to the DNS request.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides exemplary embodiments only, and is not intended to limit the scope, applicability or configuration of the disclosure. Rather, the description will provide those skilled in the art with an enabling description for implementing embodiments. It is understood that various changes may be made in the function and arrangement of elements without departing from the spirit and scope as set forth in the appended claims.

Figure 1:
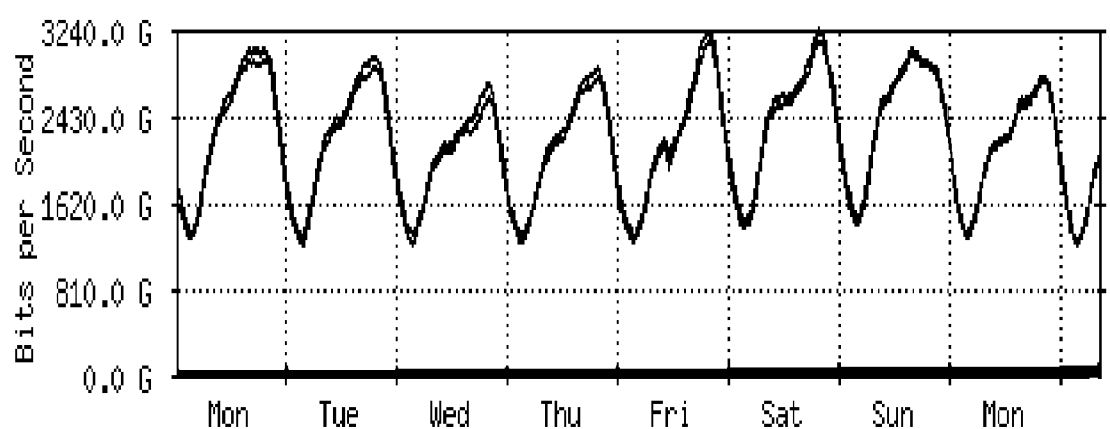
FIG. 1 shows a graph of traffic demand on a particular content delivery network (CDN) over a sample of time.

FIG. 1 shows a graph of traffic demand on a particular content delivery network (CDN) over a sample of time. The vertical axis is in gigabits of content requested per second. The horizontal axis spans just over one week. Content demand varies significantly over the various times of day. The content demand generally declines to a minimum in early morning hours of each day, and gradually rises through the day, peaking in the early evening hours. The minima are generally around 1.2 to 1.6 TB/sec while the peaks are generally around 2.8 to 3.2 TB/sec. The demand curves shown are for typical weeks; extraordinary events (e.g., large news events, marquee sporting events, release of highly anticipated movies, software updates, electronic games, etc.) can generate even more extreme swings in demand than those shown.

Variations of content demand over time present a problem for a CDN, because content providers expect prompt delivery of content at all times of day, yet typically pay only for actual deliveries. To meet delivery expectations, a CDN must build its capacity to meet demand in peak periods, knowing that some capacity will be underutilized in non-peak periods. Installed capacity is largely a fixed cost, so to pay for installed capacity, the CDN may for example charge more per delivery when it operates with a mix of utilized and underutilized capacity, than it might charge per delivery if its installed capacity were running at full utilization at all times.

Figure 2:
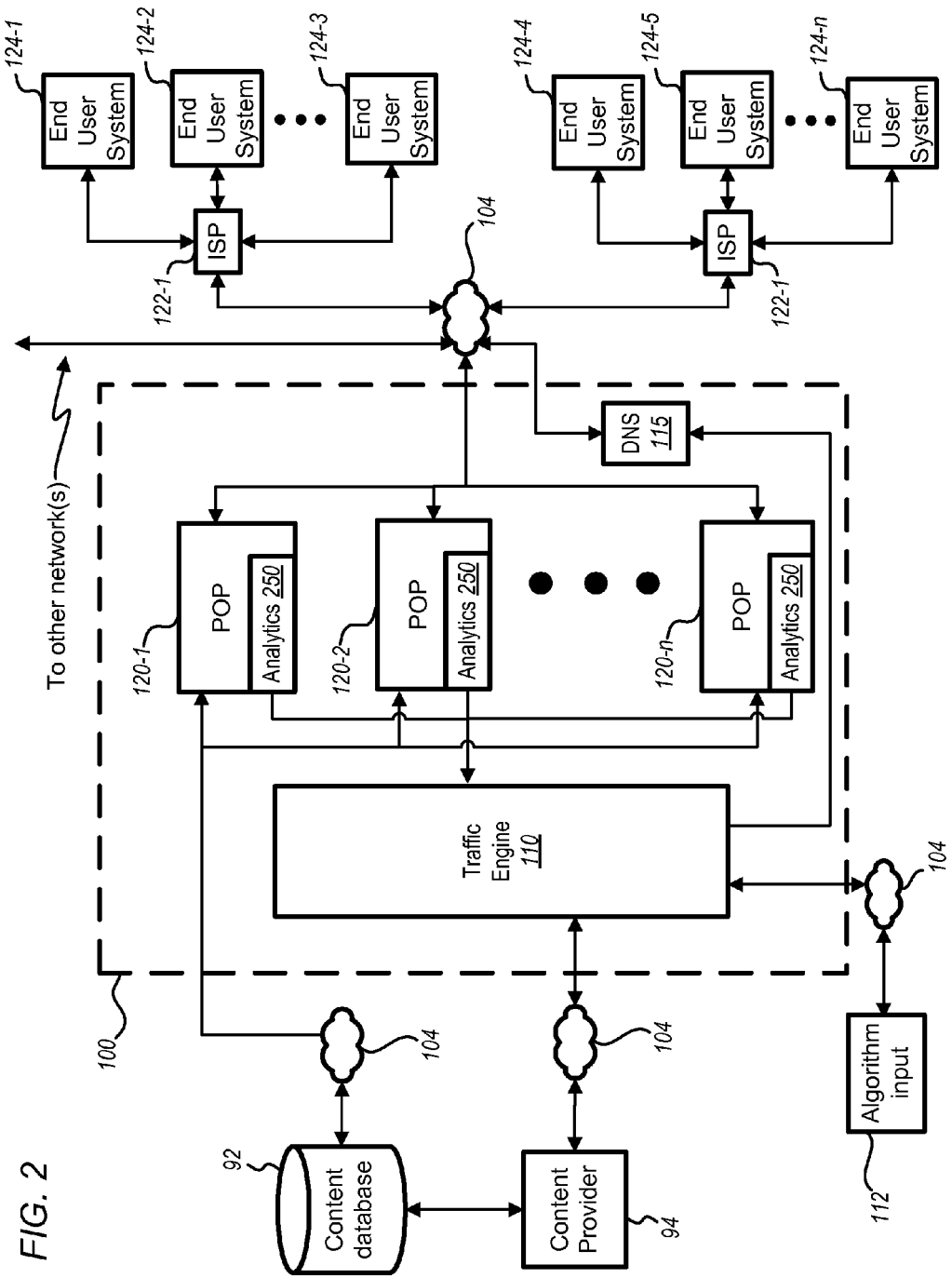
FIG. 2 is a schematic diagram illustrating functionality of a CDN that implements time varying traffic allocation, in an embodiment.

FIG. 2 is a schematic diagram illustrating functionality of a CDN 100 that implements time varying traffic allocation, in an embodiment. CDN 100 includes a traffic engine 110 that allocates traffic based on one or more factors such as time of day, current network traffic, changes in current network traffic, estimated traffic due to scheduled events, estimated traffic due to breaking news, market price for traffic, network health and/or other factors. FIG. 2 illustrates traffic engine 110 as separate from points of presence (POPs) 120 of CDN 100, but functionality of traffic engine 110 may be implemented within its own server, or may be implemented within other servers of CDN 100, either separate from or within any of POPs 120, as discussed further below in connection with FIGS. 4, 6 and 7. For example, hardware such as memory and/or one or more processors may be dedicated to traffic engine 110, or may be shared with POPs 120. Certain concepts of time varying CDN traffic allocation will be explained first in the context of a traffic engine 110 added to operation of a typical POP-based CDN, before expanding the concept to decentralized traffic allocation performed within POPs themselves.

CDN 100 receives content objects from one or more content providers 94 and serves the content objects to end user systems 124 in response to requests therefrom. Although only one content provider 94 is shown, it is understood that CDN 100 may work with any number of content providers 94. The content objects are addressed via one or more domain names associated with servers of CDN 100, by arrangement with each of the content providers 94, that is, a content provider 94 might own the rights to, or otherwise be associated with the domain name, but may arrange with CDN 100 to serve requests addressed to the domain name. Communications to and from end user systems 124, content providers 94, their respective content databases 92, CDN 100 and other entities may be routed through the Internet, illustrated in FIG. 2 as instances of Internet 104. End user systems 124 may access internet 104 through Internet Service Providers (ISPs) 122, as shown. Content providers 94 typically store content objects such as web pages (or partial content therefor), documents, audio and video files and the like in content database 92. Content providers 94 are typically customers of CDN 100 that pay or otherwise compensate CDN 100 for efficient distribution of content objects to end user systems 124. The content objects may be provided from content database 92 directly to one or more POPs 120. The number of POPs 120 within CDN 100, content providers 94, end user systems 124 and ISPs 122 are arbitrary and are not limited to the numbers of such items illustrated in FIG. 2.

In a first example of operation of CDN 100, an end user system 124 requests content from a domain name that is associated with content provider 94 through CDN 100. To determine the computer that fulfills requests directed to the domain name, a domain name resolution request is typically routed through an ISP 122 and Internet 104 and presented to a domain name service (DNS) 115 of CDN 100. DNS 115 responds to domain name resolution requests either with one or more specific IP addresses of servers that host the domain name, or with other domain names and/or IP addresses in a recursive process that continues to try to find a server that hosts the domain name. The responses provided by DNS 115 are based on information that is provided by CDN 100 for lookup tables within DNS 115. DNS 115 may respond to a domain name resolution request with one or more specific IP addresses, and an indication that the responses are authoritative, that is, the IP address is known to fulfill requests directed to the domain name. Alternatively, DNS 115 may respond with one or more other domain names or IP addresses with an indication that the name(s) or address(es) are not authoritative, such that the originating ISP will know that further domain name resolution will be needed to find a server that hosts the domain name. (When a domain name resolution response is for a different domain name as opposed to an IP address, the response cannot be authoritative.) An IP address of a server within one of the POPs 120 may be included in an authoritative response, possibly because it is known by CDN 100 that the server hosts the requested domain name, or because it is geographically close to the requesting ISP or end user system, to minimize delays in serving the request. The end user system generates a request to the IP address of the indicated server, which responds by forwarding the requested content object back through Internet 104 and ISP 122 to the requesting end user system 124.

In the above example of operation of CDN 100, typically an arrangement or contract is in place between content provider 94 and CDN 100 such that CDN 100 is compensated for delivering the content from content provider 94 to the requesting end user system 124. Time varying CDN allocation implements time varying adjustments within the scope of such arrangement, or modifies the arrangement itself. For example, in some circumstances traffic may be rerouted to another network. In an unlikely but possible option, requests may be refused entirely without rerouting. In embodiments, traffic engine 110 allocates the traffic by providing, through DNS 115, authoritative IP addresses that correspond to servers within CDN 100 to serve a request directly. Alternatively, traffic engine 110 provides, through DNS 115, IP addresses and/or domain names that direct traffic to other networks (e.g., networks other than CDN 100), sometimes as part of the recursive domain name resolution method discussed above, to find an IP address that will finally serve the request.

Thus, in CDN 100, traffic engine 110 manages the responses delivered by DNS 115 such that incoming requests are either "served" or "shunted" depending on whether the traffic is deemed economically desirable or not at a given time. In the context of this disclosure, "serving" traffic means that the IP addresses provided by CDN 100 to DNS 115 steer requests from an end user system 124 into CDN 100, instead of sending the end user system's request to a different network. "Shunting" means that the domain names and/or IP addresses provided by CDN 100 to DNS 115 steer requests not to servers within CDN 100, but to an IP address or domain name of an alternate network, to which the request for content is then directed. Thus, traffic engine 110 evaluates an algorithm or function as having a "serve" value or a "shunt" value, and communicates appropriate information transfers and/or coordinates other activities to implement serving or shunting.

As noted above, traffic engine 110 may implement time varying traffic allocation based on time of day, current network traffic, changes in current network traffic, estimated traffic due to scheduled events, estimated traffic due to breaking news, market price for traffic, network health and/or other factors. Various modes of assessing traffic and/or characterizing operation of CDN 100, and various responses of CDN 100 thereto, are also within the scope of the present disclosure.

Modes of assessing and/or steering traffic include but are not limited to the following examples. These modes of assessing and/or steering traffic may assess, calculate and/or steer traffic according to the degree to which the traffic is desirable from the point of view of maximizing revenue generated by, or efficiency of, the CDN.

In a first exemplary embodiment, traffic engine 110 utilizes historic data (e.g., the daily demand fluctuations shown in FIG. 1) as a first order criterion for whether incremental traffic should be served or shunted. POPs 120 can generate analytics information 250 of individual transactions handled through each POP; analytics information 250 (or aggregates thereof) can be accessed and analyzed by traffic engine 110 to generate real time network demand metrics such as instantaneous traffic load and change in instantaneous traffic load over time. In this sense, the daily demand shown in FIG. 1 is an example of analytics information. These metrics can be calculated across all traffic and/or may be filtered to characterize traffic loads related to specific content providers, specific content objects, specific geographic regions and the like. POPs 120 can generate network health related information, and such information can also be analyzed by traffic engine 110 to determine how many POPs 120 are currently online, what capabilities the currently online POPs have, and whether operation of any of the POPs is compromised for some reason. The information generated by POPs 120 may reflect operation of each POP as a whole, or may be granular to the level of components within each POP (e.g., to the level of individual servers within a POP, as discussed further below).

In a second exemplary embodiment, CDN 100 also receives information about scheduled releases of content that are expected to be in high demand, such as software, movie or video game releases, or about other scheduled events that are expected to increase traffic significantly, such as sporting, political or cultural events as items of algorithm input 112 (see schedule input 285, described below in connection with FIG. 3). CDN 100 may use algorithm input 112 in a function that determines whether traffic should be served or shunted. In embodiments, algorithm input 112 may provide a simple time based function that shunts all (or a large percentage of) requests within a certain daily time window and serves all (or a large percentage of) requests at other times.

In further exemplary embodiments, modes of reacting to traffic demand include but are not limited to the following examples. For example, CDN 100 may, through traffic engine 110 and DNS 115, serve certain traffic and shunt other traffic. From a revenue generation standpoint, it may be advantageous to serve all traffic when demand is low, but less so as traffic approaches the capacity of CDN 100 to serve the traffic. Selected traffic (or all traffic) may be shunted by providing DNS 115 with domain names and/or IP addresses of one or more alternate networks or servers, and instructing DNS 115 to provide such domain names and/or IP addresses in response to requests that could otherwise have been served by CDN 100. The traffic to be shunted may be selected on the basis of contracts between CDN 100 and content providers 94 that either allow or forbid such shunting, or on the basis of revenue to be realized by CDN 100 for serving requests during actual or historically high demand periods. In another example, CDN 100 may increase price that is billed for serving content when traffic is high or otherwise problematic for CDN 100 to serve, or alternatively, may decrease price that is billed for serving content when traffic is lower or otherwise easy for CDN 100 to serve. In another example, CDN 100 may modify technical guarantees that apply to delivery of content by CDN 100. Technical guarantees may include latency, bandwidth, percentage of packets dropped and/or other factors.

Any of the reactions cited above can also be implemented as combinations or on variable scales instead of abrupt switches. For example, CDN 100 may, through traffic engine 110 and DNS 115, serve a percentage of traffic for given content or for a given content provider 94, and may shunt the remainder of traffic for the given content or for the given content provider as a baseline condition. In an embodiment, traffic engine 110 evaluates a service percentage function to calculate a percentage of requests that should be served, with other requests being shunted. CDN 100 may then increase or decrease the percentage of traffic served, according to traffic levels or characterization of the operation of CDN 100. When traffic is low, CDN 100 may serve all of the traffic, while when traffic is high, CDN 100 may shunt some or all of the traffic. Traffic to be served and/or shunted may be selected by factors such as the type and/or the content provider of requested content. Such changes could also include changing pricing and/or technical guarantees. In embodiments, changes such as those discussed above could be submitted in real time to the content provider 94 for acceptance or refusal (see FIG. 3).

Traffic engine 110 may calculate and/or update a real time "market price" model that can be used as a reference point for serving or shunting traffic. That is, if contractual terms allow, a serve-or-shunt decision can depend on whether the applicable price for serving requests for a given content provider 94 is greater than the current market price.

Content provider 94 may form arrangements with an operator of CDN 100 that may allow acceptance or refusal of time varying price and/or service changes in real time through logic implemented in content provider 94, or may allow CDN 100 to vary price and/or service on a pre-agreed basis. When content provider 94 consents to the price and/or service offered by traffic engine 110, operation of CDN 100 proceeds as discussed in the first example above, with CDN 100 serving content to end user systems 124 in response to requests therefrom. When CDN 100 continues to serve requests, time varying variations of service quality may be implemented. However, if content provider 94 refuses a price and/or service offered by traffic engine 110, CDN 100 may implement a variety of alternate responses to requests for content from content provider 94. For example, CDN 100 may, in one example, provide an indication that the requested content is "not found" or "temporarily unavailable." In another example, CDN 100 has knowledge of one or more other networks that can serve domain names sourced by content provider 94, and shunts requests for such content to such other networks. Shunting of such requests may be preferable, from the point of view of a content provider 94, to simply refusing end users' requests, and performing the shunting may be acceptable to CDN 100 as a temporary and simple (e.g., less bandwidth intensive) alternative to filling the requests. To implement the alternate service of shunting requests, traffic engine 110 receives one or more alternate IP addresses or domain names from content provider 94 for networks that can serve requests that would otherwise be served by CDN 100. The alternate IP addresses or domain names are provided to DNS 115 as required such that when agreed to by CDN 100 and content provider 94, DNS 115 responds to requests for domain name resolution with an IP address or domain name that tells the requesting end user (or ISP) to "go there" to get the request fulfilled. In other examples, time varying CDN allocation may result in continued service, but with differing compensation levels or under differing performance guarantees. In still other examples, only a portion of traffic may be shunted, with some requests continuing to be served by a given CDN and other requests being routed to other networks through the alternate IP addresses or domain names as noted above.

It is appreciated herein that DNS 115 may be a part of CDN 100, as shown in FIG. 2, or may be a service that is owned and operated separately from CDN 100. When DNS 115 is separate from CDN 100, traffic engine 110 still controls traffic directed by DNS 115 to CDN 100, by feeding DNS 115 with domain names and/or IP addresses to use in responses to end user system requests for a given domain name.

It is also possible for CDN 100 to serve or shunt traffic at the level of individual content objects, as opposed to all traffic addressed to a given domain name. Although paths and file names are not addressed in a DNS request and solution, subdomains can be utilized to discriminate separately from a root domain name. For example, in the universal resource indicator (URI):

example.com/foo/bar only example.com is considered the domain name, with /foo/bar considered a path to a file; a DNS request would only be based on the example.com part of the URI. But a subdomain of example.com can be specified with a URI of:

foobar.example.com.

A DNS (e.g., DNS 115) sees the subdomain as part of the domain name being resolved, and thus can provide different domain name(s) and/or IP address(es) for foobar.example.com than for example.com. Thus, by utilizing subdomains having differing DNS domain names and/or IP addresses corresponding to specific content, a CDN can manage (that is, can serve or shunt) traffic at the level of the specific content.

Figure 3:
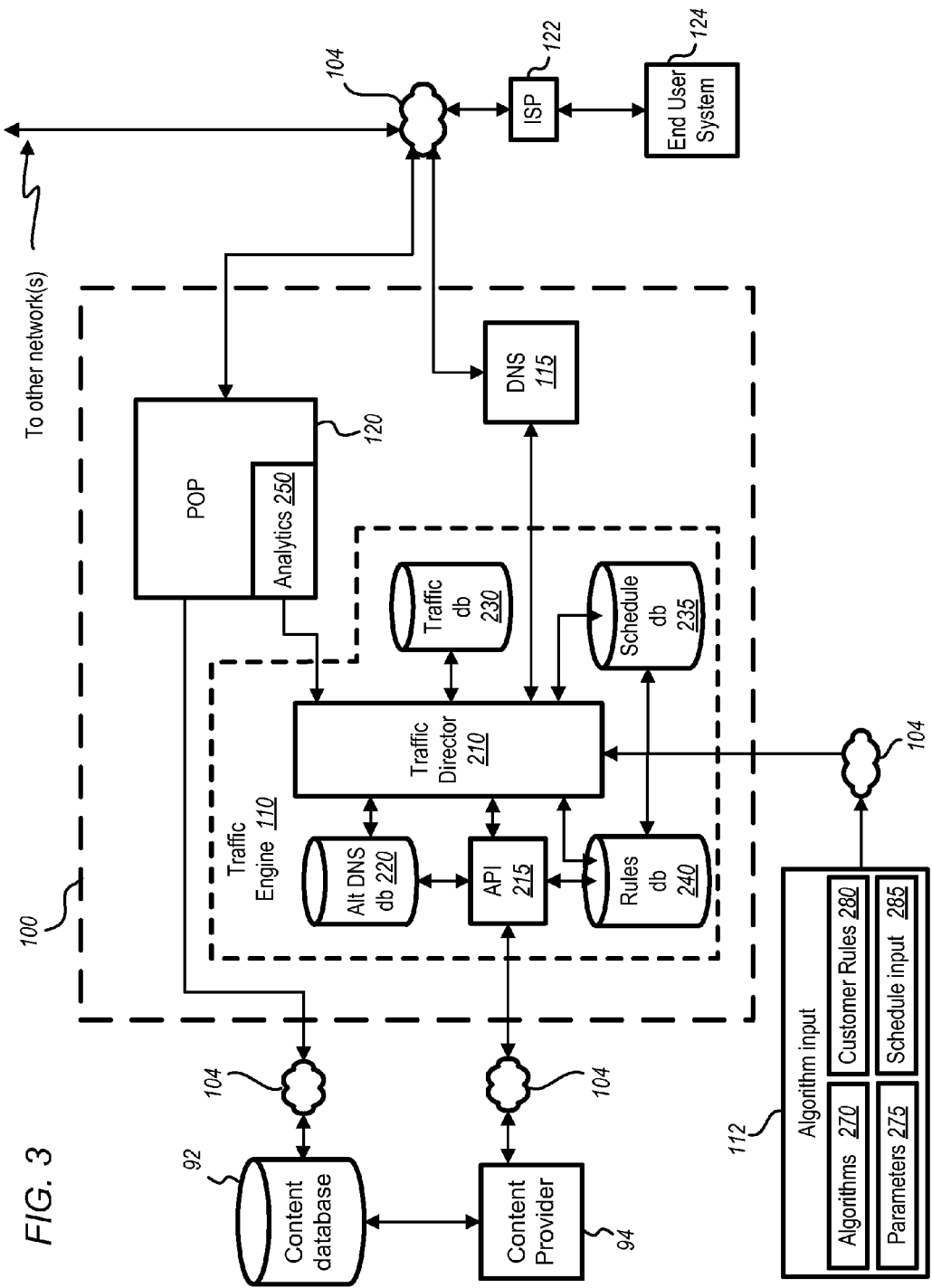
FIG. 3 is a schematic diagram illustrating certain details of the CDN of FIG. 2, in an embodiment.

FIG. 3 is a schematic diagram illustrating certain details of CDN 100, FIG. 2, in an embodiment. FIG. 3 is simplified so as to show interaction of traffic engine 110 with only one exemplary POP 120 of CDN 100 and only one ISP 122 and end user system 124, for clarity of illustration, but CDN 100 may include any number of POPs 120 and may serve any number of ISPs 122 and end user systems 124. In the embodiment shown in FIG. 3, traffic engine 110 includes a traffic director 210, an application program interface (API) 215, an alternate DNS database 220, a traffic database 230, a schedule database 235 and a rules database 240.

API 215 provides an interface for content provider 94 to exchange information with CDN 100, including, in embodiments, identifying content objects for CDN 100 to upload and distribute, accepting or refusing time varying service changes, and providing domain names and/or IP addresses of alternate networks, to which requests may be directed by CDN 100, through DNS 115. Traffic engine 110 may store domain names and/or IP addresses provided by content provider 94 in an optional, alternate DNS database 220. Through API 215, in certain embodiments, content provider 94 may consent to, or refuse, services offered by traffic engine 110 of CDN 100, as the terms offered for such services vary from time to time. Content provider 94 may utilize an automated function to respond to certain offers or terms communicated from time to time by traffic engine 110. Alternatively, one or more individuals may evaluate and respond to offers or terms communicated by traffic engine 110, through API 215, on behalf of content provider 94. Alternatively, traffic engine 110 of CDN 100 may implement time varying traffic allocation based on a pre-established agreement between a content provider and CDN 100 that permits at least some time varying flexibility in serving requests for content.

FIG. 3 also shows POP 120 including analytics information 250. Traffic director 210 of traffic engine 110 can access and utilize analytics information 250 to determine demand on, and/or operational health of, POP 120. For example analytics information 250 may include entries that detail the time, size and specific content of each request placed to or served by POP 120, and may include entries that detail the operating characteristics of POP 120 such as resources available at each POP 120, cumulative operating time, percent utilization of the resources of POP 120, degraded status of any resources of POP 120, power consumed by and temperature of servers of POP 120, and the like. Analytics information 250 may be aggregate statistics at a summary level for POP 120 or CDN 100, or may be more granular, such as information about individual servers within POP 120. All such information is accessible by traffic director 210, which may generate aggregated statistics about network demand on, and health of, POPs 120 in real time. The aggregated statistics may be utilized by traffic director 210 to make time varying network allocation decisions and/or may be stored in traffic database 230 for future use.

FIG. 3 also shows algorithm input 112, including optional algorithms 270 to be utilized by traffic engine 110 in forming offered price and/or service guarantees. Traffic engine 110 uses algorithm input 112 to form or modify price and/or technical guarantees according to demand and analytics information characterizing CDN 100. For example, in embodiments, traffic director 210 receives algorithms 270 that may be evaluated to provide a serve or shunt value, a market price for delivery of content by CDN 100, and/or technical guarantee levels or changes thereto, based on actual or expected demand. Actual demand may be assessed in real time using analytics information 250 related to a subset of transactions, while expected demand may be assessed using historical analytics information (e.g., the data of FIG. 1), real time rate of change of demand calculated from analytics information 250, and schedule input 285. Algorithm input 112 also includes optional parameters 275 to be utilized in algorithms 270, such as baseline demand data or models (e.g., the data of FIG. 1 or abstractions thereof), baseline price models, pricing rates for certain services or service quality (e.g.: prices per request, per megabyte of content to be delivered, or both; price dependence on bitrate to be provided; prices for internal processing services such as transcoding; etc.). Algorithm input 112 may also include customer rules 280, which may for example constrain traffic director 210 when handling traffic related to one or more content providers 94 on a case by case basis, as required by contracts between the operator of CDN 100 and a given content provider 94. For example, a contract might be summarized as an agreement that CDN 100 will provide a certain price to a content provider 94 for requests actually served by CDN 100, in exchange for CDN 100 retaining the ability to shunt or refuse a certain amount of traffic to an alternate CDN during peak periods. The certain amount of traffic may or may not be limited in terms of number of requests, over a certain percentage of time, at certain times of day and the like. When shunting is part of a contract, content provider 94 may provide domain name(s) and/or IP address(es) of one or more alternate networks to take the traffic that is shunted. The domain name(s) and/or IP address(es) may be input by content provider 94 to API 215 and routed to alternate DNS database 220, or uploaded to traffic engine 110 as part of customer rules 280. When traffic director 210 determines from time to time that shunting traffic is both advantageous and acceptable under contract term with a particular content provider 94, the domain name(s) and/or IP address(es) for the alternate network(s) are supplied to DNS 115 of CDN 100, such that requests for the content to be shunted are not served, but responded to by supplying the domain name(s) and/or IP address(es) for the alternate network(s). Algorithm input 112 may also include schedule input 285, which may be fed directly to traffic director 210 and/or stored in an optional schedule database 235 of traffic engine 110. Traffic director 210 may utilize schedule input 285 to predict changes in traffic due to prescheduled events. Schedule input 285 may include information about events expected to affect network traffic, so that prices can be adjusted in advance of the expected traffic changes, to maximize productivity and/or revenue generated by CDN 100, given the expected traffic changes. For example, schedule input 285 may include scheduled timing of major sports or political events, video releases, software releases or video game releases that could significantly increase network traffic.

Figure 4:
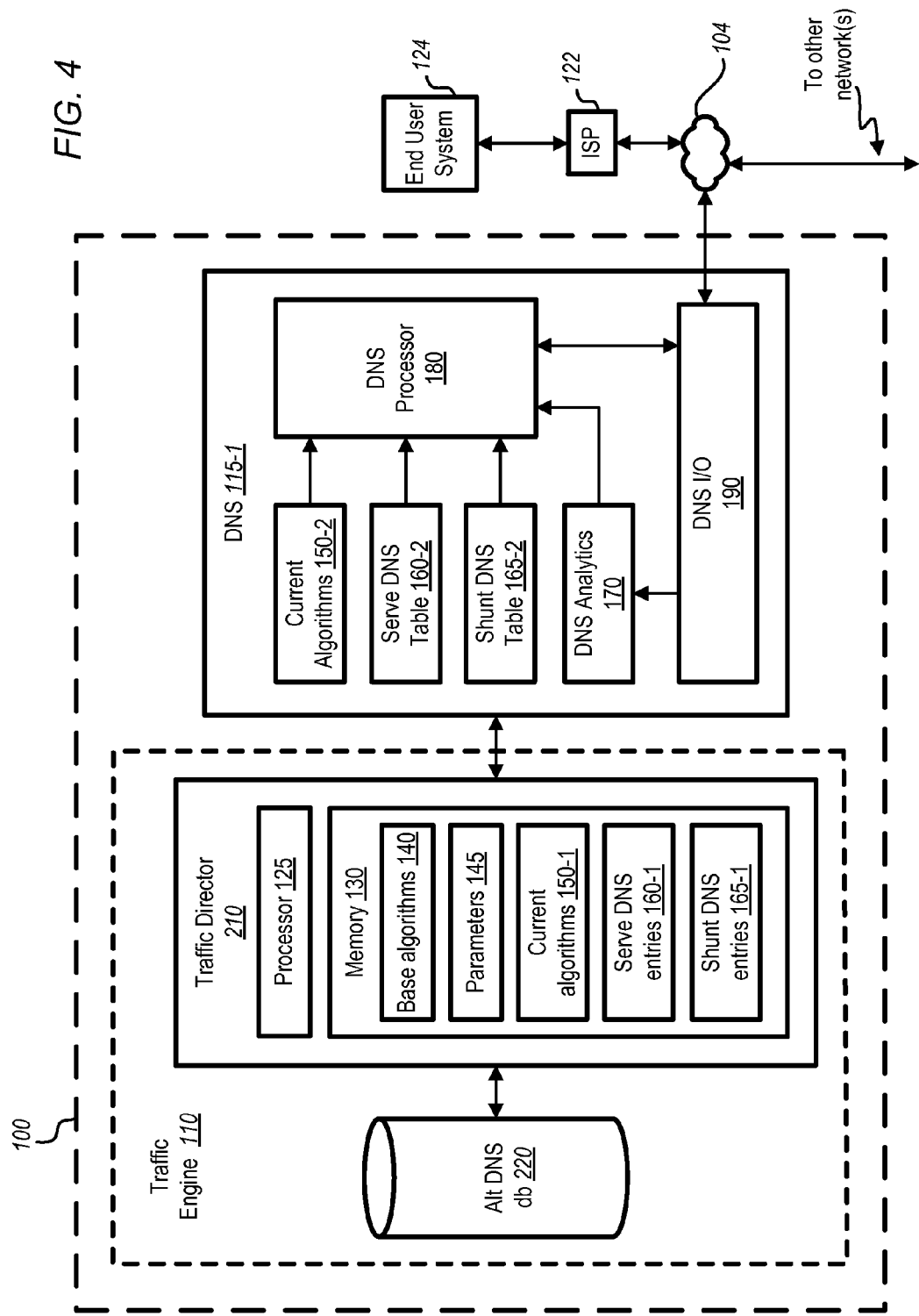
FIG. 4 is a schematic diagram illustrating exemplary details of the traffic engine and DNS function shown in the CDN of FIG. 2, in an embodiment.

FIG. 4 is a schematic diagram illustrating further exemplary details of traffic engine 110 and DNS 115 shown in CDN 100, FIG. 2, in an embodiment. Only alternate DNS database 220 and traffic director 210 are shown within traffic engine 110 in FIG. 4, for clarity of illustration; traffic engine 110 may also include some or all of the items shown in FIG. 3 that are not shown in FIG. 4. A specific example of DNS 115, FIG. 2, is shown in FIG. 4 as DNS 115-1 for clarity with respect to other DNS embodiments described later herein.

DNS operation is typically set up to be very simple and fast; for example a conventional DNS function might simply execute and report a simple table look-up. However, in time varying traffic allocation embodiments, it is possible and advantageous for a DNS to quickly run a few lines of code, to combine serving the DNS request with an actual serve or shunt decision, instead of having to rely on such decisions from an upstream decision maker (e.g., traffic engine 110). In the embodiment shown in FIG. 4, DNS 115-1 evaluates simple algorithms and quickly makes and implements serve or shunt decisions. High speed operation of DNS 115-1 is facilitated by traffic director 210, which provides DNS 115-1 with ready-to-evaluate algorithms and lookup tables, as now described.

In FIG. 4, traffic director 210 includes a processor 125 and memory 130 (alternatively, if traffic engine 110 operates as part of a POP, traffic director 210 may operate using a processor and memory of the POP). The memory stores one or more of base algorithms 140, parameters 145, current algorithms 150-1, a serve DNS table 160-1, and a shunt DNS table 160-2. Traffic director 210 may for example receive algorithms 270 into memory as part of algorithm input 112, FIG. 3, and store them as base algorithms 140; and may receive parameters 275 into memory as part of algorithm input 112, FIG. 3, and store them as parameters 145.

Traffic director 210 analyzes traffic and may generate current algorithms 150-1 for use by DNS 115-1 for example by selecting among possible base algorithms 140, inserting parameters 145 into base algorithms 140, and/or modifying parameters 145 and then inserting the modified parameters into base algorithms 140. When an algorithm is thus modified and ready to run, the algorithm is loaded into a table of current algorithms 150-1. A set of current algorithms 150-2 within DNS 115-1 is created and/or maintained based on current algorithms 150-1 in traffic director 210. Similarly, serve DNS entries 160-1 and shunt DNS entries 165-1 are created by or stored within traffic director 210, and corresponding lookup tables 160-2 and 165-2 are created and/or maintained based on serve DNS entries 160-1 and shunt DNS entries 165-1.

DNS 115-1 also includes a DNS processor 180, optional DNS analytics 170, and DNS I/O 190. When DNS 115-1 receives a DNS request from an end user system 124 (typically through an ISP 122 and Internet 104, as shown) the DNS processor examines the domain name requested, and selects an algorithm from set of current algorithm 150-2 that corresponds to the requested domain name. The current algorithm is retrieved from current algorithms 150-2 and evaluated by DNS processor 180 to return a serve or shunt decision. Depending on the decision, a lookup from serve DNS table 160-2 or shunt DNS table 165-2 provides the appropriate outgoing IP address(es) and/or domain name(s), which are transmitted back to the requesting end user system 124 by DNS I/O 190. DNS I/O 190 may also provide an indication of each outgoing DNS response to optional DNS analytics 170, and DNS processor 180 may utilize information from DNS analytics 170 as it evaluates a current algorithm to determine a serve or shunt decision. This may particularly be the case when DNS processor 180 evaluates a service percentage algorithm that calls for serving or shunting a percentage of requests, with the percentage varying according to traffic conditions, price or other factors. Use of DNS analytics 170 in the serve or shunt decision making within DNS 115-1 helps the DNS process run quickly by having all necessary information and/or algorithms available. That is, DNS 115-1 does not need wait for information about service of previous requests, or other information, from traffic engine 110 or POPs 120 to evaluate the service percentage algorithm when an incoming domain name resolution request is received. Similarly, traffic engine 110 and other parts of CDN 100 need not verify where previous requests for content were actually served (e.g., by CDN 100 or another network); DNS 115-1 simply uses information about its own previous responses to serve or shunt DNS requests instead.

Figure 5:
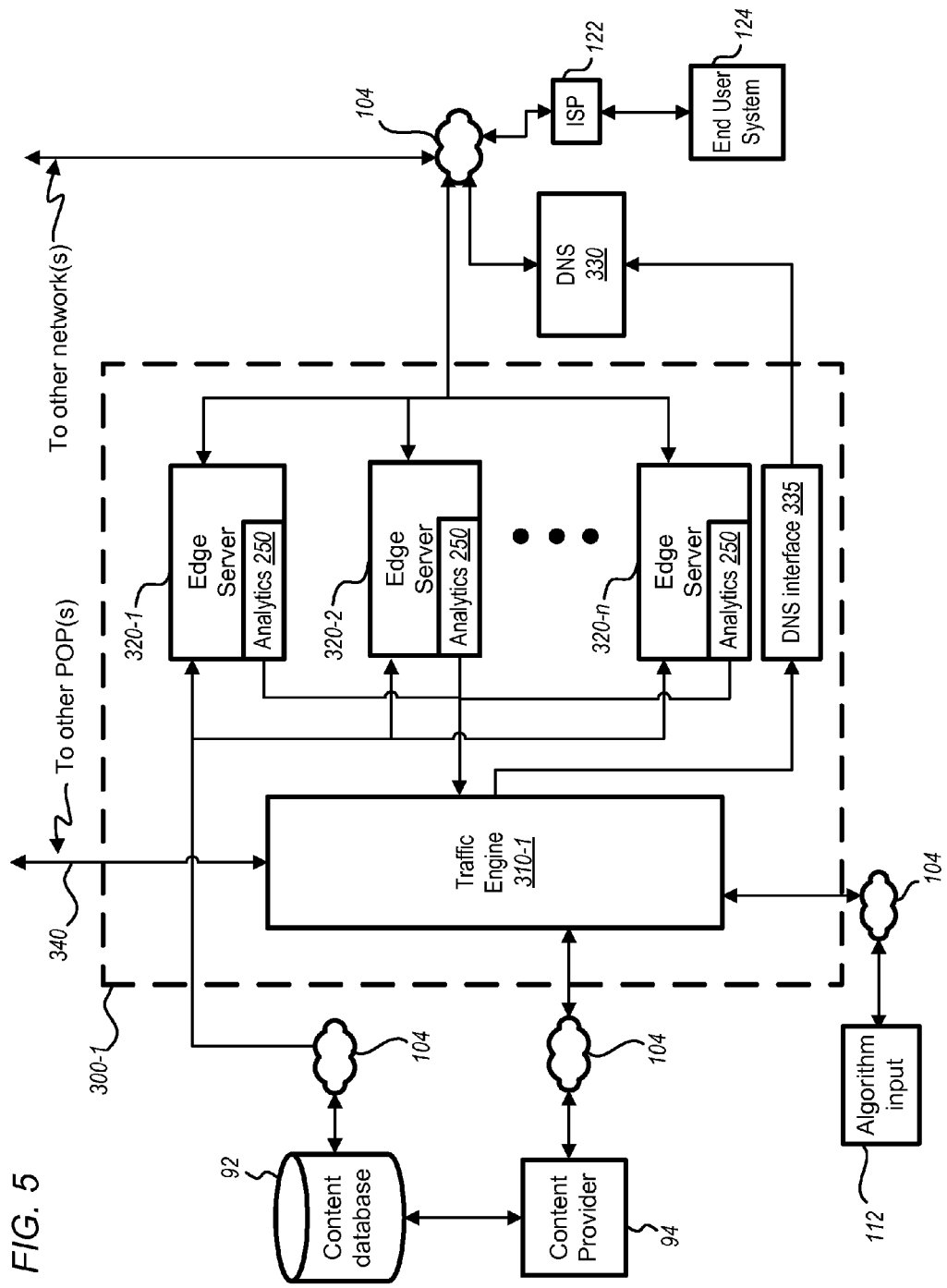
FIG. 5 is a schematic diagram illustrating certain details of a point of presence (POP) that supports time varying traffic allocation, in an embodiment.

FIG. 5 is a schematic diagram illustrating certain details of a POP 300-1 that supports time varying traffic allocation, in an embodiment. POP 300-1 supports time varying CDN traffic allocation at the level of a single POP, that is, all of the functionality required to perform the traffic allocation is within POP 300-1, instead of utilizing a traffic engine 110 across POPs, as in FIGS. 2 and 3. Time varying traffic allocation at the level of single POPs advantageously provides granularity of traffic allocation, sometimes allocating traffic away from overburdened servers within a POP more effectively than a central traffic engine trying to work with all POPs in a CDN simultaneously. That is, many of the reasons to decentralize time varying traffic allocation at the POP level are similar to reasons for having POPs that are geographically spread out in the first place. POPs that are geographically spread are necessarily spread among time zones, and therefore will see traffic peaking at different times per POP. For example, if a streaming video provider typically generates a demand peak between 5 pm and 8 pm, the aggregate demand may be excessively weighted by North American demand to look like the demand shown in FIG. 1, but worldwide on a given day, regional peaking will occur sequentially in Australia, eastern Asia, central Asia, the Middle East, Europe, South America, eastern North America, and western North America. Because POPs in such regions may have individual traffic handling limitations, it is advantageous for such POPs to implement time varying traffic allocation independently.

However, decentralization of the time varying traffic allocation function need not cause undue repetition of support activities for the function at multiple POPs, as now discussed. Traffic engine 310-1 may include any or all of the capabilities of traffic engine 110, FIGS. 2 and 3; for example traffic engine 310-1 may include one, some or all of a traffic director, a traffic database, a schedule database, an API, an alternate DNS database, and a rules database as those items are described with respect to FIG. 3. As shown in FIG. 5, traffic engine 310-1 accepts schedule input 285 and algorithm input 112, and interfaces with a content provider 94, much like traffic engine 110 interfaces with the same external entities in FIGS. 2 and 3. Instead of interfacing with POPs 120, traffic engine 310-1 interfaces with individual edge servers 320. POP 300-1 interfaces with a domain name service (DNS) 330, shown in FIG. 5 as outside POP 300-1; however, DNS 330 may be a separate entity as shown, or may reside on one of edge servers 320 or traffic engine 310-1 within POP 300-1. A single ISP 122 and end user system 124 are also shown for clarity of illustration, it being understood that POP 300-1 may serve requests from any number of ISPs 122 and/or end user systems 124.

Typical operation of a CDN would include routing incoming requests from end user system 124 via ISP 122 to DNS 330 for resolution of each incoming request by domain name, to an IP address of a specific edge server 320 that can serve the domain name. In FIG. 5, traffic engine 310-1 and DNS 330 not only determine which servers serve which domain names, but also whether a given request should be routed to an edge server in POP 300-1, or should be denied or shunted to another network. This is done for example by traffic engine 310-1 maintaining duplicate tables of DNS entries corresponding to normal operation of POP 300-1 (e.g., serving all requests directed to domain names that can be supported by edge servers 320 therein) and operation in which at least certain content object requests are to be shunted. A first table corresponds to normal operation provides IP addresses of edge servers 320 that can serve certain domain names, while a second table corresponds to operation in which requests for the domain names are to be shunted, provides domain names and/or IP addresses of an alternate network that can serve the domain names. The alternate domain names and/or IP addresses are designated by content provider 94. Traffic engine 310-1 writes the appropriate table entries to a DNS interface 335 that relays the table entries to DNS 330, such that the table entries become available for immediate use. DNS interface 335 may be implemented by software running on a server of POP 300-1 and/or may be implemented within traffic engine 310-1. When traffic engine 310-1 determines that requests for a certain domain name are to be shunted, traffic engine 310-1 writes entries from the second table, through DNS interface 335, to overwrite corresponding entries in DNS 330 such that DNS 330 responds with the IP address of the alternate network. When traffic engine 310-1 determines that requests for the domain name are once again to be fulfilled instead of shunted, traffic engine 310-1 writes entries from the first table, through DNS interface 335, to overwrite the corresponding entries in DNS 330 such that DNS 330 responds by providing the IP address of the edge server 320 that can fulfill the requests. An optional connection 340 to other POPs allows POP 300-1 to share information such as traffic levels, routing rules and alternate IP addresses with other POPs, as discussed further below. Also, it should be understood that optional connection 340 may be a real connection (e.g., a wide area network (WAN) or local area network (LAN) connection) or a virtual connection (e.g., a request routed through Internet 104, like certain other connections shown in FIG. 5).

Figure 6:
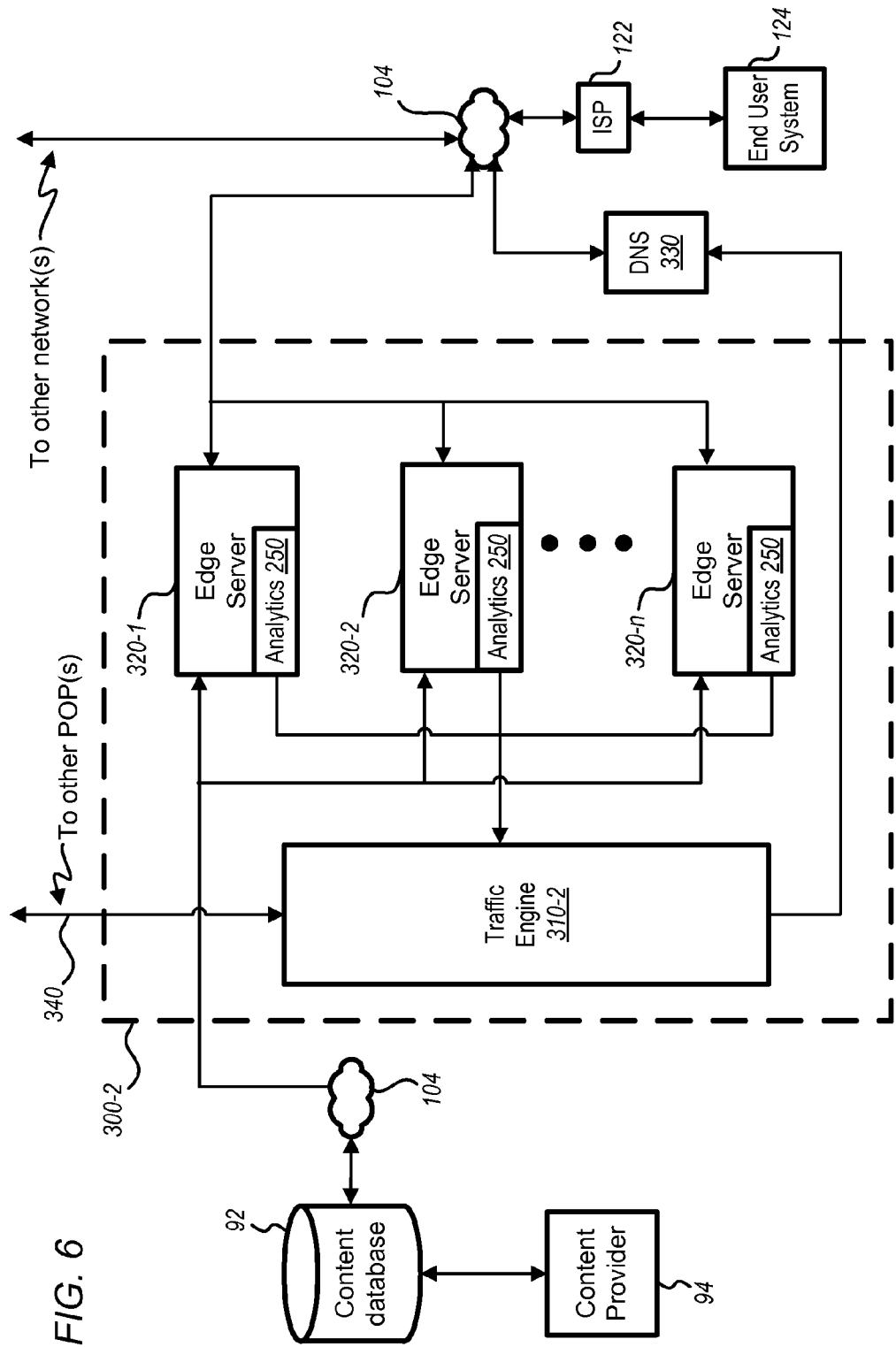
FIG. 6 is a schematic diagram illustrating certain details of another POP that supports time varying traffic allocation, in an embodiment.

FIG. 6 is a schematic diagram illustrating certain details of a POP 300-2 that supports time varying traffic allocation, in an embodiment. POP 300-2 supports time varying CDN traffic allocation at the level of a single POP, except that unlike POP 300-1, POP 300-2 does not support input functions such as accepting analytics input and interface with a content provider. POP 300-2 includes a traffic engine 310-2 that may include for example some or all of a traffic director, a traffic database, an alternate DNS database, and a rules database as those items are described with respect to FIG. 3. The functions supported by traffic engine 310-2 can perform time varying traffic allocation at a POP level, but traffic engine 310-2 does not take raw input about customer rules or alternate domain names and/or IP addresses, or analytics input from other POPs. Instead, such information is provided via connection 340 to one or more other POPs, for example POP 300-1, FIG. 5, as shown. Instead of analyzing input from content provider 94 and algorithm input 112, traffic engine 310-2 receives ready-to-implement rules, algorithms and alternate domain names and/or IP addresses from another POP through connection 340 (as in FIG. 5, it should be understood that connection 340 may be a real or a virtual connection, e.g., a connection made through the Internet). Traffic engine 310-2 then applies the received rules and algorithms in light of its own traffic conditions to implement time varying traffic allocation locally. In this manner, a single POP 300-1 with complete analysis and content provider interface capability can serve more or less as a "master" POP for time varying traffic allocation purposes, while several POPs 300-2 function as "slave" POPs. As noted above, this provides a way to decentralize time varying traffic allocation without completely duplicating support features thereof across a network. POPs 300-2 may also analyze local traffic conditions and report such conditions so that POP 300-1 can develop aggregate network traffic data, which may in turn affect the rules propagated back out from POP 300-1 to POPs 300-2.

It should be clear from the above discussion that variations on the differences between POPs 300-1 and 300-2 are also possible; for example a POP otherwise similar to POP 300-2 may include some capability to interface with a content provider 94, and/or to receive and utilize algorithm input 112. CDNs having POPs with various mixtures of the capabilities described above are within the scope of the present disclosure.

Figure 7:
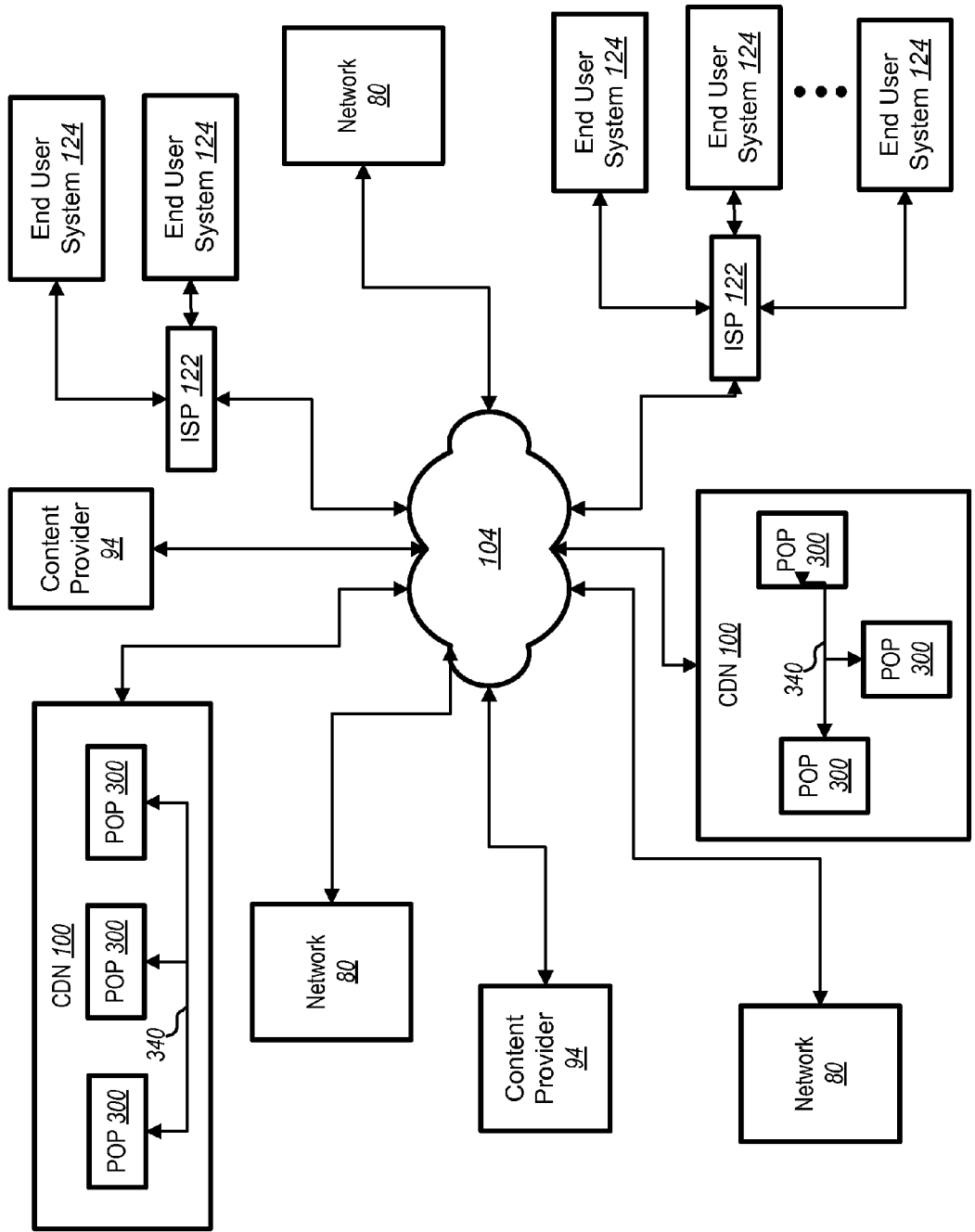
FIG. 7 is a schematic drawing illustrating exemplary connectivity of multiple networks, CDNs, ISPs and their respective end user systems over internet connections, in an embodiment.

In embodiments, information that can be captured and used to assess traffic demand is not limited to information provided by sources such as algorithm input 112, content providers 94 and/or connections 340. For example, information of any system or network connected to internet 104 may be captured by CDN 100 or POPs 120, 300 through their respective connections to internet 104, as discussed with respect to FIGS. 5 and 6 via connections 340. FIG. 7 is a schematic drawing illustrating exemplary connectivity of multiple networks 80, content providers 94, CDNs 100, ISPs 122 and their respective end user systems 124 over internet 104. Information from any such sources can be utilized to assess traffic demand.

Figure 8:
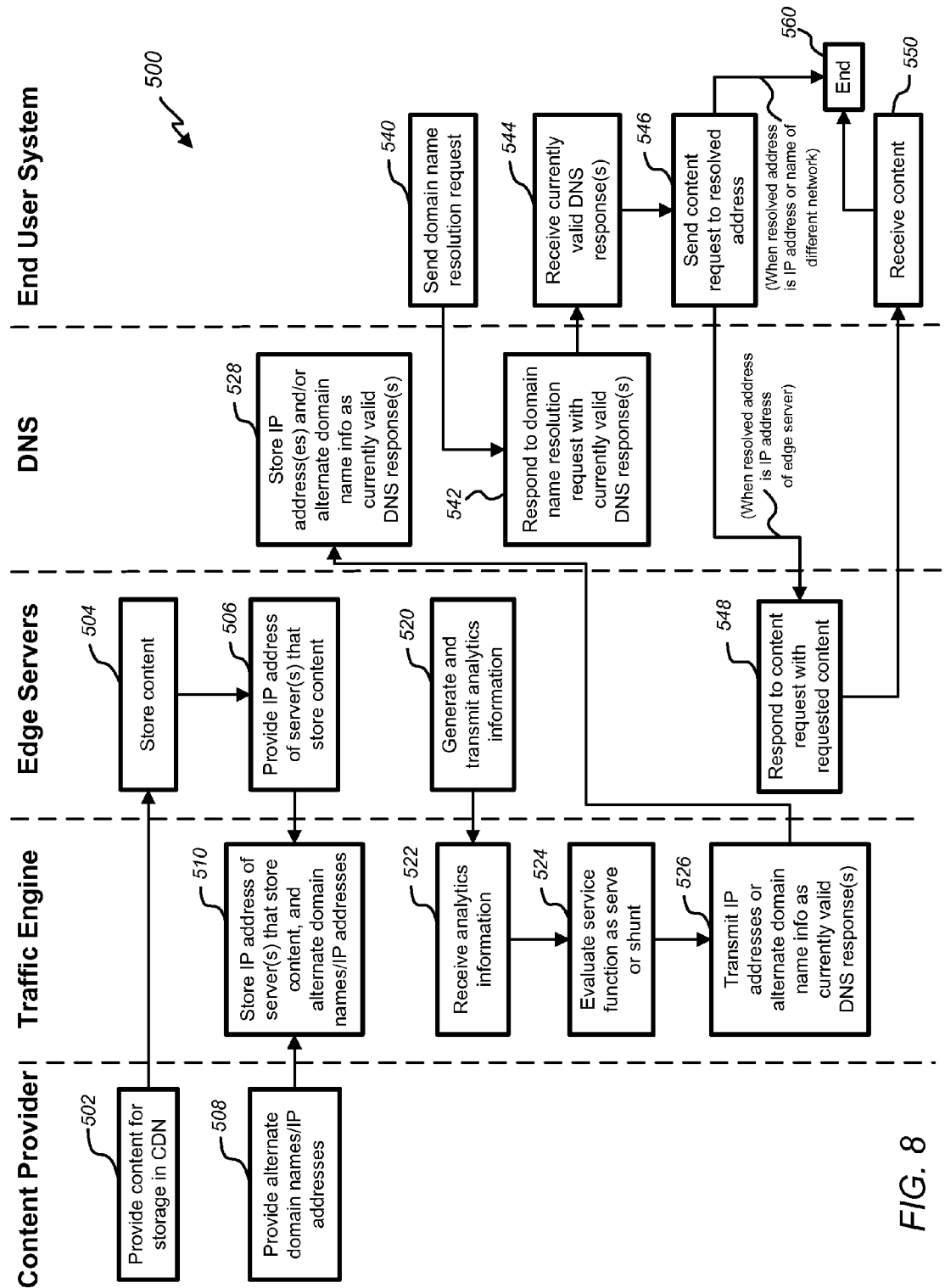
FIG. 8 is a swim diagram illustrating a method for time varying CDN traffic allocation, in an embodiment.

FIG. 8 is a swim diagram illustrating a method 500 for time varying CDN traffic allocation. The steps of method 500 may be executed by a content provider (e.g., content provider 94, FIGS. 2, 3, 5 and 6), a traffic engine (e.g., traffic engine 110, FIGS. 2 and 3, or traffic engine 310, FIGS. 5 and 6), one or more edge servers (e.g., any of edge servers 320, FIGS. 5 and 6, or edge servers within any of POPs 120, FIGS. 2 and 3 or POPs 300, FIGS. 5 through 7), a DNS (e.g., any of DNS 115, FIGS. 2 through 4, or DNS 330, FIGS. 5 and 6) and an end user system (e.g., any of end user systems 124, FIGS. 1 through 7). Method 500 includes three sets of linked steps: steps 502 through 510 that correspond to setup of a CDN for a content item, steps 520 through 528 that correspond to setup of the DNS with appropriate IP addresses and/or domain name information for the content item, and steps 540 through 560 that perform traffic allocation for the content item. Each of the linked sets of steps may be performed independently and/or repeatedly without necessarily performing the other linked sets of steps, as discussed below.

Method 500 begins with step 502, in which content is provided for storage in the CDN. In step 504, an edge server stores the content. An example of steps 502 and 504 is content provider 94 transmitting content to an edge server 320, or an edge server within a POP 120 or 330, that stores the content. In step 506, the edge server that stores the content provides its IP address, associated with a domain name that provides the content, to a traffic engine. This provides the traffic engine with an IP address of a server that can serve the domain name directly. An example of step 506 is edge server 320, or an edge server within a POP 120 or 330, that stores content, transmitting an IP address to traffic engine 110, FIGS. 2 and 3, or traffic engine 310, FIGS. 5 and 6, associating the IP address with the domain name. In step 508, the content provider provides alternate domain name and/or IP address information for a different network that can serve the domain name, to the traffic engine. This provides the traffic engine with an IP address or alternate domain name for a network that can serve the domain name in the event that traffic is to be shunted. An example of step 508 is content provider 94 transmitting alternate IP address or domain name information for a different network that can serve the domain name to traffic engine 110, FIGS. 2 and 3, or traffic engine 310, FIGS. 5 and 6, associating the alternate IP address or domain name information with identity of the domain name. In step 510, the traffic engine stores the IP addresses and/or domain name information received in steps 506 and 508. Steps 502 through 510 are repeated as necessary for any domain name for which time varying allocation is to be performed; these steps may be performed repeatedly to store IP addresses and/or domain name information for a given domain name before, while, or after other steps of method 500 are performed for other domain names.

In step 520 of method 500, one or more edge servers generate analytics information that a traffic engine can use to evaluate a service function to yield a serve value or a shunt value. An example of step 520 is edge server 320, or an edge server within a POP 120 or 330, generating analytics information. This information is received by a traffic engine in step 522. Analytics information can also be received by a traffic engine from other sources that are not shown in FIG. 8 for clarity of illustration. For example, analytics information can be obtained from schedule input 285, FIG. 3, or received from other edge servers or POPs, or can simply be based on time of day or day of week, as discussed above. In step 524, the traffic engine utilizes the analytics information to evaluate a service function to yield a serve or shunt value for one or more domain names. An example of step 524 is traffic engine 110, FIGS. 2 and 3, or traffic engine 310, FIGS. 5 and 6, evaluating a service function to calculate a shunt value for a specific domain name. In step 526, the traffic engine transmits IP addresses and/or alternate domain name information, associated with one or more domain names depending on the serve or shunt value determined in step 524, to the DNS for use in answering domain name resolution requests for the specific domain name. An example of step 524 is traffic engine 110, FIGS. 2 and 3, or traffic engine 310, FIGS. 5 and 6, transmitting alternate domain name information to DNS 115, FIGS. 2 through 4, or DNS 330, FIGS. 5 and 6, associated with the specific domain name for which step 524 was performed, above. In step 528, the DNS stores the IP addresses and/or alternate domain name information received from the traffic engine, associated with the corresponding domain name(s), as currently valid DNS responses in the DNS lookup table. Having an IP address or alternate domain name information in the lookup table essentially allows the DNS to provide quick service that includes the result of the serve or shunt decision, by providing the DNS with the response corresponding to the serve or shunt value, whichever is applicable at a given time.

Like linked steps 502 through 510, steps 520 through 528 can be performed at nearly any time and/or repeatedly, regardless of whether domain name resolution requests are actually received. The only prerequisite to the performance of steps 520 through 528 is that IP addresses and/or alternate domain name information have been communicated to the traffic engine (e.g., in steps 502 through 510) to be acted upon. For example, the traffic engine may be set up to run steps 520 through 528 whenever new content is received, and repeated for the content periodically thereafter. Analytics information may also be utilized to trigger repetition of steps 520 through

528, for example when traffic levels reach a threshold or when the analytics information shows that a given domain name is in high demand.

In step 540 of method 500, an end user system sends a domain name resolution request associated with a domain name to the DNS. An example of step 540 is any end user system 124 sending a domain name resolution request to any of DNS 115, FIGS. 2 through 4, or DNS 330, FIGS. 5 and 6. In step 542, the DNS responds to the domain name resolution request by supplying the currently valid DNS response. Because the currently valid DNS response was stored in step 528, the response incorporates the result of the serve or shunt value for the domain name that was evaluated by the traffic engine. An example of step 542 is DNS 115, FIGS. 2 through 4, or DNS 330, FIGS. 5 and 6 returning the alternate domain name information that was stored for the domain name in step 528, discussed above. In steps 544 and 546, the end user system receives the DNS response and requests a domain name utilizing the DNS response. Examples of steps 544 and 546 are the end user system 124 that sent the domain name resolution request in step 540, receiving the DNS response and requesting the domain name utilizing the DNS response as a resolved address. In the case noted above, the alternate domain name information results in method 500 ending at step 560, because the request is shunted to a different network named by the alternate domain name. However, if a serve value was calculated in step 524, and an IP address of an edge server of the CDN is provided in step 546, the request for content is forwarded to the edge server, which responds to the requested domain name in step 548. The requested content is received at the end user system in step 550, whereafter method 500 ends at step 560.

Like steps 502 through 510 and 520 through 528, steps 540 through 560 may be performed repeatedly without repetition of the previous steps; the only prerequisite to performance of steps 540 through 560 is that the DNS have a currently valid response stored for a content object. One consequence of this is that by default, a CDN may simply set up a default DNS response when a content item is first uploaded into the CDN (e.g., corresponding to a default serve decision) and only executing steps 506 through 510, and steps 520 through 528, to prepare for possible shunting of requests, as a hedge against (or in response to) high demand.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. It is contemplated that as necessary, functionality of the items identified herein may be provided by specially designed electronic hardware or by software executing on electronic hardware.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the terms "memory" and/or "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A content delivery network (CDN) that performs time varying traffic allocation, the network comprising:
   one or more edge servers, wherein:
   the edge servers store content corresponding to a domain name that is associated with a content provider, and the edge servers are configured to deliver the content to end users in response to requests received at the edge servers from the end users;
analytics information characterizing the CDN; and
a traffic engine that:
periodically evaluates a service function as having a serve value or a shunt value for the domain name, based at least in part on the analytics information;
transmits one or more IP addresses of the edge servers to an interface to a domain name service (DNS) while the service function has the serve value for the domain name; and
transmits alternate domain name information of a different network to the interface while the service function has the shunt value;
wherein, at a first time:
the traffic engine determines, based on the analytics information, that the service function has the serve value for the domain name,
the traffic engine transmits an IP address of at least one of the edge servers to the interface, and
the one of the edge servers serves content corresponding to the domain name, in response to a request for the content from one of the end users that is directed to the domain name and is resolved by the DNS to provide the IP address;
and at a second time:
the traffic engine determines, based on the analytics information, that the service function has the shunt value for the domain name, and
the traffic engine transmits the alternate domain name information of the different network to the interface.

2. The CDN that performs time varying traffic allocation of claim 1, the network comprising one or more points of presence (POPs), wherein each POP comprises one or more of the edge servers.

3. The CDN that performs time varying traffic allocation of claim 1, the analytics information comprising information generated by the one or more edge servers as the one or more edge servers deliver the content to the end users.

4. The CDN that performs time varying traffic allocation of claim 1, the analytics information comprising aggregated information from a plurality of the one or more edge servers.

5. The CDN that performs time varying traffic allocation of claim 1, wherein:
a contract between a service provider and the CDN provides a contract price for delivery of a given item of content;
the traffic engine models a market price for delivery of content based on the analytics information, the market price being lower at the first time than at the second time; and
the traffic engine determines the service function as having the serve value when the market price is lower than or equal to the contract price, and determines the service function as having the shunt value when the market price is greater than the contract price.

6. The CDN that performs time varying traffic allocation of claim 1, wherein the analytics information includes one or more of time of day, current traffic, current change of traffic over time and anticipated traffic due to a scheduled event.

7. The CDN that performs time varying traffic allocation of claim 1, wherein the traffic engine comprises an application program interface (API) that receives at least part of the analytics information, and the alternate domain name information, from the content provider.

8. The CDN that performs time varying traffic allocation of claim 7, wherein the API:
forwards proposed changes in service or price to the content provider; and
receives an acceptance or rejection of the proposed changes in service or price from the content provider, as part of the analytics information.

9. A content delivery network (CDN) that performs time varying traffic allocation, the network comprising:
one or more edge servers that
store content objects from one or more content providers, each content object being associated with at least one domain name, and
deliver the content to end users in response to requests from the end users;
a traffic engine that:
transmits an authoritative internet protocol (IP) address of one of the edge servers that stores at least one content object of the content, and alternate domain name information of a different network, to a domain name service (DNS),
adjusts parameters of a service percentage algorithm that defines a percentage of incoming requests for the content object that will be served by the CDN, with other incoming requests being shunted to the different network, based on analytics information characterizing the CDN, and
periodically transmits the service percentage algorithm to the DNS; and
the DNS, which:
receives the authoritative IP address, the alternate domain name information and the parameters from the traffic engine,
receives requests for domain name resolution, and in response to a received domain name resolution request:
evaluates the service percentage algorithm to determine whether the received domain name resolution request will be served or shunted, and
responds to the received domain name resolution request with the authoritative IP address when the received domain name resolution request will be served, or with the alternate domain name information when the received domain name resolution request will be shunted;
wherein:
at a first time:
the DNS responds to a first percentage of domain name resolution requests for a domain name associated with the content object by delivering the authoritative IP address,
the one of the edge servers having the authoritative IP address serves the content object, and
the DNS responds to other domain name resolution requests for the domain name associated with the content object by responding with the alternate domain name information such that the other domain name resolution requests are shunted to the different network; and
at a second time:
the DNS responds to a second percentage of domain name resolution requests for the domain name associated with the content object by delivering the authoritative IP address for one of the edge servers, the second percentage being different from the first percentage based on the analytics information, the one of the edge servers having the authoritative IP address serves the content object, and the DNS responds to other domain name resolution requests for the domain name associated with the content object by responding with the alternate domain name information such that the other domain name resolution requests are shunted to the different network.

10. The CDN that performs time varying traffic allocation of claim 9, wherein the alternate domain name information is one of an alternate domain name of the different network and an IP address of a server of the different network.

11. The CDN that performs time varying traffic allocation of claim 9, wherein the DNS:

stores a serve DNS table containing the authoritative IP address and a shunt DNS table containing the alternate domain name information; and evaluates each incoming domain name resolution request to determine whether the incoming domain name resolution request is within the first percentage of domain name resolution requests.

12. The CDN that performs time varying traffic allocation of claim 11, wherein the traffic engine stores a table of serve DNS entries and a table of shunt DNS entries, and periodically updates at least a portion of the serve DNS table and the shunt DNS table of the DNS with entries from the table of serve DNS entries and the table of shunt DNS entries.

13. The CDN that performs time varying traffic allocation of claim 9, wherein the DNS:

generates DNS analytics information for domain name resolution requests served by the DNS, and at the first time, utilizes the DNS analytics information to evaluate the service percentage algorithm.

14. A method of time-based content delivery network (CDN) traffic allocation, comprising:

storing content, from one or more content providers and associated with one or more domain names, on a plurality of edge servers that are configured to deliver the content to end users in response to requests received by the edge servers from the end users, each of the domain names being hosted by at least one of the edge servers;

storing an authoritative internet protocol (IP) address for the one or more domain names;

storing alternate domain name information of a different network than the CDN for the one or more domain names;

determining a service function as having a serve value or a shunt value for each of the domain names, based at least in part on analytics information of the CDN; and when a domain name service (DNS) request is received by the CDN from one of the end users for one of the domain names:

when the service function for the one of the domain names has the serve value:

transmitting the authoritative IP address for at least one of the edge servers that hosts the one of the domain names, in response to the DNS request, receiving a request for the one of the domain names at the edge server having the authoritative IP address, and delivering content of the requested one of the domain names, from the edge server having the authoritative IP address to the one of the end users;

and when the service function for the one of the domain names has the shunt value:

transmitting the alternate domain name information in response to the DNS request.

15. The method of time-based content delivery network (CDN) traffic allocation of claim 14, wherein the analytics information comprises traffic service records.

16. The method of time-based content delivery network (CDN) traffic allocation of claim 14, wherein the analytics information comprises operating characteristics of one or more of the plurality of edge servers.

17. The method of time-based content delivery network (CDN) traffic allocation of claim 14, wherein determining the service function as having the serve value or the shunt value utilizes information of prescheduled events.

18. The method of time-based content delivery network (CDN) traffic allocation of claim 14, wherein determining the service function as having the serve value or the shunt value follows customer rules.

* * * * *